United States Patent [19]
Enge et al.

[11] Patent Number: 5,992,441
[45] Date of Patent: Nov. 30, 1999

[54] FUEL VAPOR VENT VALVE

[75] Inventors: Trevor L. Enge, Novi, Mich.; Larry VanNatta, Mt. Morris; Manuel D. Rosas, Coletta, both of Ill.; Mark Osterbrink, St. Clair Shores; Michael Wroblewski, Dearborn, both of Mich.; Terry L. Miller, Morton, Ill.

[73] Assignee: Borg-Warner Automotive, Inc., Troy, Mich.

[21] Appl. No.: 09/128,313

[22] Filed: Aug. 3, 1998

Related U.S. Application Data

[63] Continuation-in-part of application No. 08/922,772, Sep. 3, 1997, which is a continuation-in-part of application No. 08/555,129, Nov. 8, 1995, Pat. No. 5,687,756.

[51] Int. Cl.$^6$ ..................................................... F16K 24/04
[52] U.S. Cl. .......................... 137/202; 137/43; 137/68.16; 137/329.4
[58] Field of Search ................................. 137/43, 68.16, 137/202, 329.4

[56] References Cited

U.S. PATENT DOCUMENTS

| | | | |
|---|---|---|---|
| 5,313,977 | 5/1994 | Bergsma et al. ..................... | 137/202 X |
| 5,404,907 | 4/1995 | Benjey et al. ...................... | 137/202 X |
| 5,590,697 | 1/1997 | Benjey et al. ...................... | 137/202 X |
| 5,687,756 | 11/1997 | VanNatta et al. ...................... | 137/202 |

Primary Examiner—Gerald A. Michalsky
Attorney, Agent, or Firm—Reising, Ethington, Barnes Kesselle, Learman & McCulloch; Greg Dziegielewski

[57] ABSTRACT

A fuel vapor vent valve for a motor vehicle is connected to an upper wall of a fuel tank in vertically depending relationship. The valve has a cover with a vapor exit passage connected to a fuel vapor storage canister and a body depending from the cover. One embodiment has a vapor exit port that communicates with the fuel tank interior adjacent the upper wall of the fuel tank. A vent tube has one end connected to the vapor exit passage and an opposite end that communicates with the vent exit port and defines a valve seat. The vapor exit port is located with respect to the valve seat so as to separate liquid fuel particles from vapor flow during fuel fill. The valve seat is closed by a valve element attached to a float when the fuel tank is full. Several further embodiments of the valve have the body connected to the cover to accommodate side impacts to the fuel tank.

7 Claims, 7 Drawing Sheets

FUEL VAPOR VENT VALVE

This is a continuation-in-part of U.S. patent application Ser. No. 08/922,772 filed Sep. 3, 1997 which is a continuation-in-part of Ser. No. 08/555,129 filed Nov. 8, 1995 for a vehicle refueling valve, now U.S. Pat. No. 5,687,756 issued Nov. 18, 1997.

TECHNICAL FIELD

This invention relates to a fuel vapor vent valve and more particularly to a fuel vapor vent valve for use with motor vehicle fuel tanks.

BACKGROUND OF THE INVENTION

In the typical fuel vapor vent valve for a motor vehicle fuel tank that is adapted to prevent spillage in case of shaking, tilting or rollover of the vehicle, the valve normally opens the fuel tank to an orifice that is connected by a vapor exit passage in the valve body to a vapor hose leading to a fuel vapor storage device. The valve body is commonly made as a one-piece plastic injected molded part that has a simple direct connection between the orifice and the vapor exit passage. However, this connection has a tendency to collect and pass any liquid fuel issuing from the orifice under pressure from the tank on to the vapor storage canister. The latter contains a fuel vapor absorber such as carbon and any liquid fuel delivered thereto will quickly reduce its vapor absorbing ability. An example of such vent valve is disclosed in U.S. Pat. No. 5,044,389 granted to David R. Gimby Sep. 3, 1991 for a high volume fuel vapor release valve and assigned to the assignee of the present invention.

It is difficult to configure the top of the molded body with a vapor exit passage connection that would somehow trap this liquid fuel after it passes through the orifice and then drain the trapped liquid fuel back to the tank. This is also the case where the valve is omitted and only venting is provided through an orifice in a vent body that mounts on the fuel tank.

As to any such possible liquid fuel drainage back to the tank in the case of a vent assembly having a valve that blocks the orifice on overfill, vehicle shaking, tilting and/or rollover, adversely affecting the operation of the valve for normal venting operation in an upright position and closure under these various circumstances must be considered. Any drainage path for liquid fuel trapped downstream of the orifice can not provide a path for fuel vapor to vent around the closed valve in the normal upright attitude of the tank or allow liquid fuel to escape from the tank when tipped or inverted.

One solution to such problem is set forth in U.S. Pat. No. 5,413,137 granted to David R. Gimby May 9, 1995 for a fuel vapor vent assembly with liquid trap; also assigned to the assignee of the present invention. The fuel vapor vent assembly set forth in the '137 patent embodies a fuel impervious insert that is adapted to be mounted in such a vent valve body and defines both a vertically oriented vent orifice and a liquid basin extending about the exit of this orifice. A simple cavity formed in the interior of the top of the plastic body cooperates with the basin in the insert to define an expansive chamber elevated above the orifice with a horizontal vapor exit passage in the plastic body adapted to be connected to a vapor storage device. The expansive chamber forms an elevated liquid trap at the exit of the orifice that traps liquid from the venting fuel vapor while permitting venting to continue therethrough and then drains the trapped liquid in the basin back into the tank through the orifice in the insert when the pressure in the fuel tank is relieved. The liquid trapping chamber has a ceiling directly opposite the orifice dead ending the vapor stream issuing therefrom and the vapor exit passage is connected to the expansive chamber at a point above the basin. These features combine to aid in separating any liquid fuel out from the vapor and down into the basin and prevent it from passing on to the vapor exit passage and thence to the vapor storage canister.

While suitable for their intended purpose, the fuel vapor vent assemblies set forth in the aforesaid prior art Gimby patents do not include provision for venting vapor from the tank as the float is closing at the same rate at which the fuel tank is being filled nor do they provide a predetermined vapor dome space within said tank to accommodate vapor pressure increases when the refueling valve is closed. Further, the unitary body arrangements are configured to locate the valve seat close to the tank top and the fuel vapor openings well below the valve seat so that venting is restricted as the float moves between its normally open position and its normally closed position. Moreover, the valve disclosed in the Gimby '389 patent has a direct path for liquid fuel to splash through the fuel vapor openings of the valve body into the vapor outlet past the valve seat.

Furthermore, the valves disclosed in the aforementioned Gimby patents use a unitary housing that does not accommodate side impacts to the fuel tank that tend to displace the housing portion in the fuel tank in the lateral direction.

In our prior patent application, Ser. No. 08/555,129 filed Nov. 8, 1995 for a vehicle refueling valve, now U.S. Pat. No. 5,678,756 issued Nov. 18, 1997, we provided several improvements for the vent valves of the type discussed above. However, each of the improved valves also used either a unitary or a two piece housing that did not accommodate side impacts the fuel tank. The two piece housings comprised a cover member that was permanently fixed to the fuel tank and a cylindrical member that was disposed inside the fuel tank. However, in each instance the cylindrical member was secured firmly to the cover member so that the two piece housing was substantially the same as a unitary housing with regard to side impacts.

In our first continuation in part application, U.S. patent application Ser. No. 08/922,772 filed Sep. 3, 1997 we proposed several improvements and enhancements to the refueling valve that is disclosed in the '756 patent. These improvements and enhancements are repeated in this second continuation-in-part application.

In this second continuation-in-part application we also address side impacts to the fuel tank. Regarding this further aspect, an object of the invention is to provide a fuel vapor vent device that has a two piece housing comprising a cover and a body in which the body includes a float containing section and is connected to the cover in such a manner so as to accommodate side impacts within the fuel tank while maintaining the ability to effect closure of the valve.

These and other objects, advantages and features of the present invention will become more apparent from the following description and accompanying drawings wherein:

DETAILED DESCRIPTION OF THE PREFERRED EMBODIMENT

Figure 1:
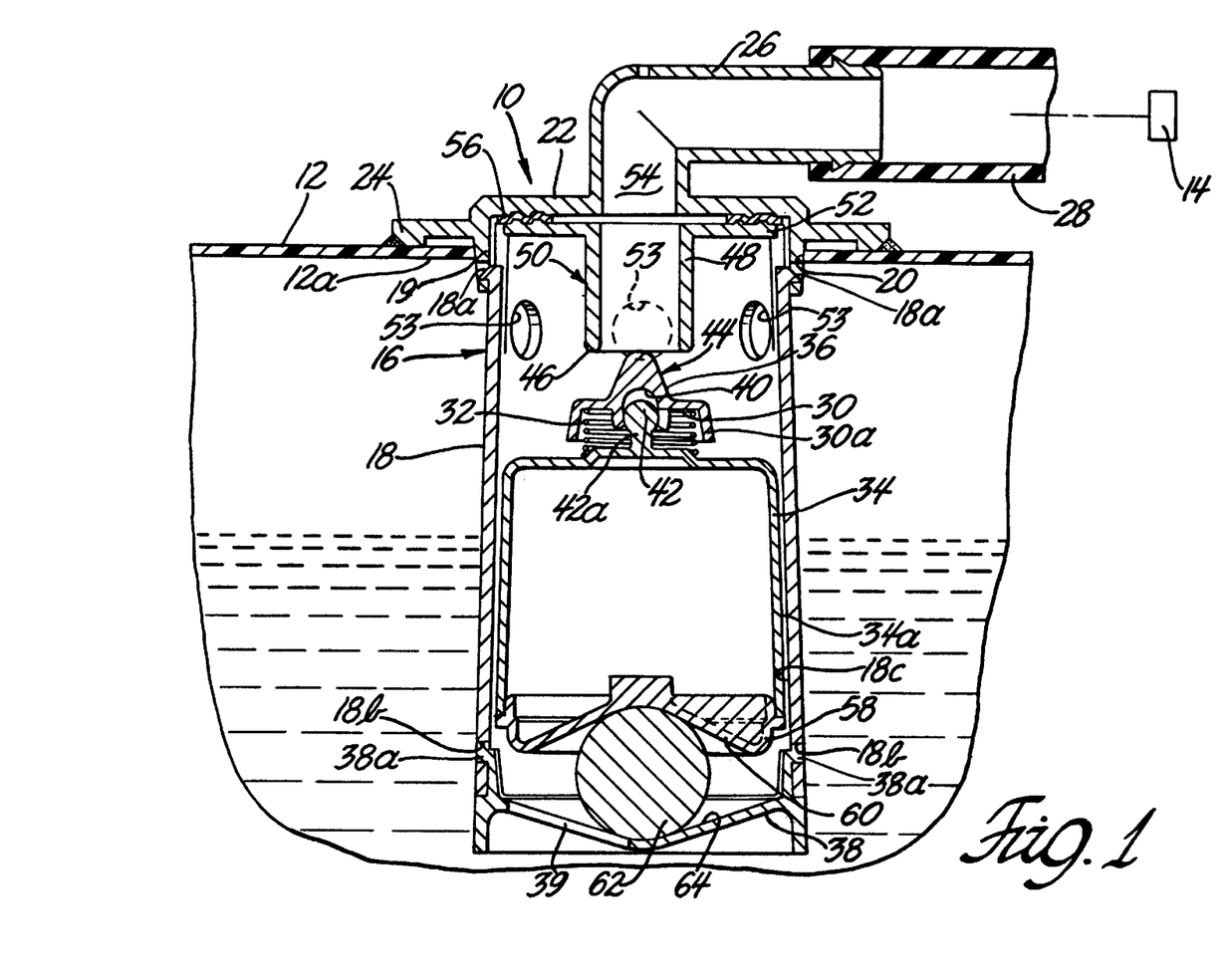
FIG. 1 is a sectional view of a motor vehicle fuel tank vapor vent valve assembly disclosed in U.S. Pat. No. 5,678,756.
Figure 2:
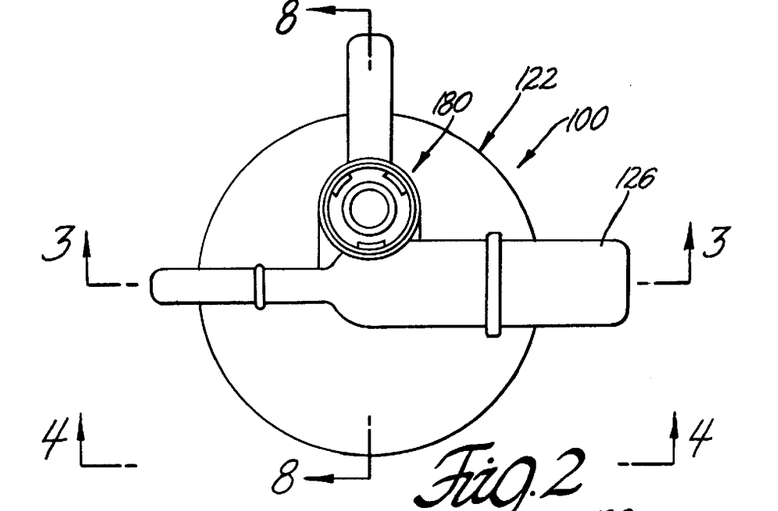
FIG. 2 is a top view of a vent valve assembly of a preferred embodiment of the invention.

Referring to FIG. 1, there is illustrated a fuel vapor vent valve assembly for venting a motor vehicle fuel tank 12 to a fuel vapor storage canister 14 containing a fuel absorber such as carbon. The fuel tank 12 is made of highdensity polyethylene (HDPE), as is the cover 22 and flange 24 of the valve assembly 10, this material being selected for its ability to be welded to fuel tanks.

The valve assembly 10 comprises body 16 that includes a generally cylindrical valve containing section 18 with tabs 18a thereon snap fit to a cylindrical extension 19 received in an opening 20 through the top wall of fuel tank 12. Cover 22 is also made of a high-density polyethylene (HDPE), this material being selected for its ability to weld to the fuel tank 12. Thus the flange 24 is welded about its perimeter to the tank to sealingly secure the fuel vapor vent valve assembly in place in a normal vertically oriented or upright position as shown in FIG. 1. The valve cover 22 has an integrally formed hose fitting or outlet tube 26 by which the fuel vapor vent valve device is adapted to be connected by a hose 28 to the vapor storage canister 14. Mounted in the valve body 16 are a spring seat 30, spring 32, float 34, valve 36 and a closure member 38 at the bottom of the valve containing section 18. A liquid inlet opening 39 is provided in the closure member 38 for communicating the interior of the valve body 16 with the liquid fuel as the tank fills for purposes to be discussed.

The spring seat 30 has an annular skirt 30a and an elongated ball socket 40. A ball 42 is provided on the upper end of the float 34 for universally connecting the float 34 to the spring seat 30. The ball 42 is biased to the bottom of the elongated ball socket 40 by the spring 32 which allows the spring seat 30 to move relative to the float 34 in the vertical direction. The float 34 is located within the valve housing 18 and has an outer wall 34a centered in spaced relationship to the inner wall 18a of the valve housing 18. The spring seat 30 carries the valve element 36 as a central upstanding valve element with a tapered conical outer surface 44 aligned with a valve seat 46 on the end of an extension 48 of a vent tube 50 with an annular collar 52 located in sealing engagement with a vapor exit passage 54. The sealing engagement is provided in part by an annular seat member 56 interposed between the collar 52 and the underside of the cover 22. The vent tube 50 receives fuel vapors from the fuel tank from vapor exit ports 53 formed in the upper end of the valve housing 18 at a point located closely adjacent the upper wall or top 12a of the fuel tank and at a point that is high enough above the valve seat 46 to avoid fuel carry over into the vapor exit passage and thence into the fuel vapor canister 14. As illustrated in FIG. 1, the vent tube 50 locates the valve seat 46 a substantial distance below the top 12a of the fuel tank 12 so that liquid fuel can not flow in a direct linear path through the vapor exits ports 53 and into the vapor exit passage 54 past valve seat 46. In fact, for all practical purposes, liquid fuel cannot even flow in a direct linear path into the extension 48.

The spring 32 rests on the seat 30 and is received at its lower end around the shank portion 42a of the ball 42 at a centrally located point on the upper end of the float 34.

The float 34 includes a weighted closure disk 58 that will maintain the outer wall 34a of the float 34 in spaced relationship to the inner surface 18a of the valve housing 18.

The underside of the weighted closure disk 58 is configured to have a conical surface or ramp 60 that is supported on a ball 62 that is, in turn, supported by the conical inner surface or ramp 64 of the closure member 38. In the illustrated arrangement, the float and weighted closure disk 58 are heavy enough not to shut off flow at low pressure buildups in the fuel tank 12, but are light enough to float in the fuel during a fuel filling operation in which the fuel level is raised in the fuel tank 12 toward the top 12a thereof. The weight in the weighted closure disk 58 is placed such that the float 34 always floats straight up within the valve housing section 18 thereby to reduce frictional contact between the float 34 and the valve body 16. The angle of ramp of the conical surface 64 is configured such that it will allow the ball 62 to move and shut the float valve when the vehicle tilts greater than a predetermined amount, such as in a range of 30°. The ball 62 also has to be heavy enough to overcome the buoyancy force created by the float 34 in order to close the float valve shut in the event of a vehicle roll over.

The bottom closure member 38 includes tabs 38a thereon that are configured to fit into openings 18b on the bottom end of the valve housing section 18. It includes a liquid inlet opening 39 therein to allow for a substantially unrestricted flow of fuel into the interior of the valve housing 18 for causing the float 34 to float in response to liquid fuel flow into the tank 12.

The vapor exit passage 54 is configured to be large enough to vent vapors at the same rate as the rate of fuel flow into the fuel tank during a filling operation. The communication between the vapor exit ports 53 and the inlet end of the vent tube 48 is selected so that there is no orifice-like restriction therebetween that can produce over pressurization of the tank during filling. The result is that there is substantially no pressure build up in the fuel tank during the refueling operation due to entrapment of vapor. The vapor exit ports 53 are configured and located so that vapor can vent from the tank and out the port or vapor exit passage 54 through an offset flow path defined by the fact that the vent exit ports 53 are located above and laterally of the entrance to the vent tube 50 at the valve seat 46. The vapor exit ports 53 are large enough to cause vapors to flow without restriction during the refueling operation. Furthermore, the vapor exit ports 53 are high enough in the tank so that the liquid droplets that might occur in the tank are not able to flow directly from the vapor exit ports 53 to the valve seat 46 during the refueling operation or during tilting or other jousting of the fuel tank 12 thereby to avoid any fuel carryover to the charcoal canister 14 that can affect its vapor absorbing capacity.

The conical configuration of the tapered outer surface 44 is selected to slowly restrict vapor flow during closure of the float valve that would otherwise build up pressure in the fuel tank as the fuel moves the float upwardly during a fuel filling operation. The conical shape is configured so that there is enough pressure build up in the tank to shut the fuel nozzle supplying the tank from the fuel filler pipe even though the float the valve is not completely closed. This allows for some of the vapor to vent and drain the fuel in the filler pipe head as the tank reaches its fuel shut off level. Additionally, the conical part of the valve is spring loaded by the spring 32 to allow the valve element 36 to shift into a centered relationship with the valve seat center 46 for sealing thereacross when the valve is closed.

Additionally, the above-described arrangement avoids a sudden build up of pressure in the tank that might otherwise cause a fuel spit back effect at the fill head.

The location of the valve seat 46 is below the vapor exit ports 53 and is located at a height below the top of the fuel tank 12 to provide a desired fuel shut off height that will allow for an assured vapor dome space in the fuel tank that will enable vapor pressure buildup to occur after the float valve is closed.

Fuel vapor vent valve assembly 10 can be used as a refueling valve because of the high flow capacity of the relatively large unobstructed vent tube 50 and vapor exit passage 54. The fuel vapor vent valve assembly 100 shown in FIGS. 2–9 also has utility as a refueling valve. Assembly 100 has improvements and enhancements in comparison to the refueling valve assembly 10 as explained below.

Figure 3:
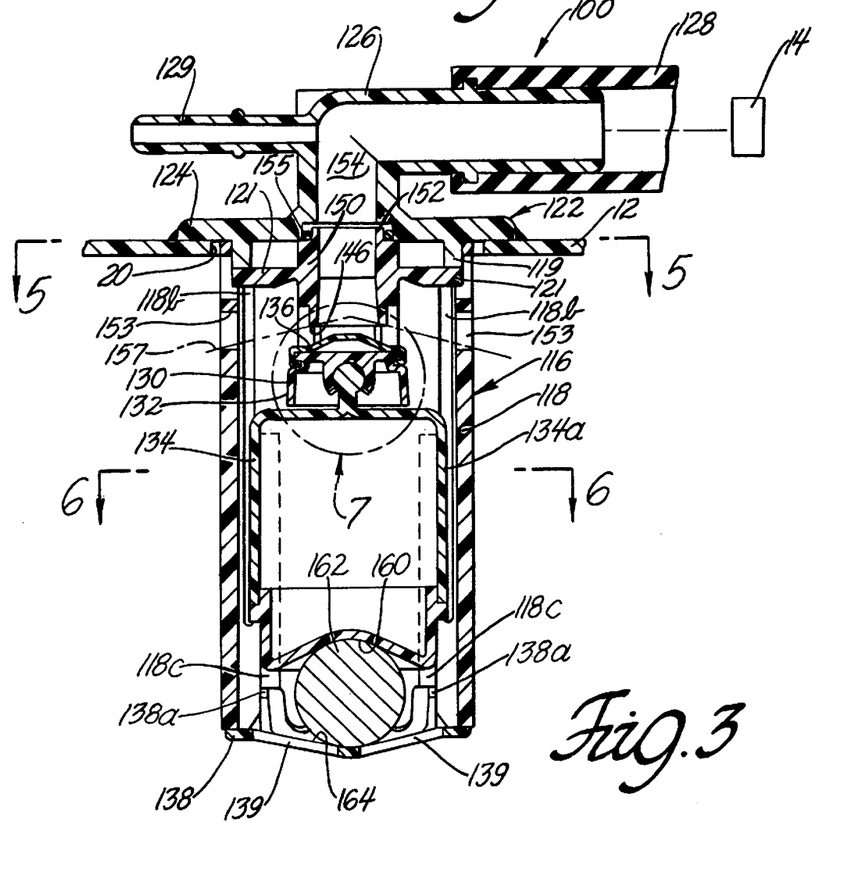
FIG. 3 is a sectional view taken substantially along the line 3—3 of FIG. 2 looking in the direction of the arrows.
Figure 4:
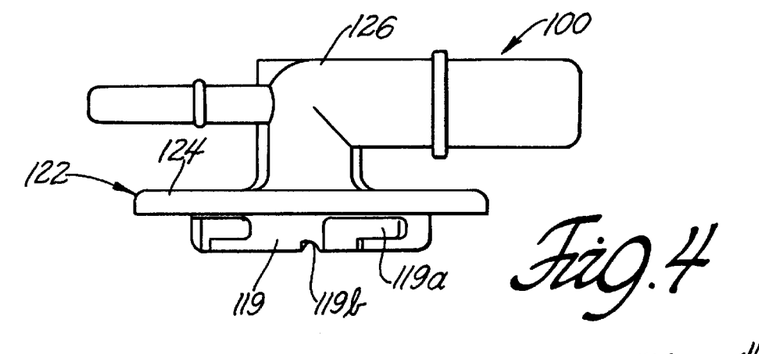
FIG. 4 is a sectional view taken substantially along the line 4—4 of FIG. 2 looking in the direction of the arrows.

Fuel vapor vent valve assembly 100 comprises body 116 that includes a generally cylindrical valve containing section 118. Section 118 has lugs 118a (FIG. 5) at the upper end that extend radially inwardly for connection to a cylindrical extension 119 of cover 122 received in an opening 20 through the top wall of fuel tank 12 as explained in detail below. Cover 122 is also made of a high-density polyethylene (HDPE), this material being selected for its ability to weld to the fuel tank 12. Thus cover 122 can be welded about the perimeter of flange 124 to the fuel tank vertically oriented or upright position as shown in FIG. 3. The valve cover 122 has an integrally formed hose fitting or outlet tube 126 by which the fuel vapor vent valve device is adapted to be connected by a hose 128 to the vapor storage canister 14. A smaller inlet tube 129 at the back end of outlet tube 126 provides for connecting a rollover or vent valve such as the valve shown in U.S. Pat. No. 5,413,137, cited above, in series with the refueling valve assembly 100. Inlet tube 129 is eliminated or closed off in the absence of such a valve.

Mounted in the valve body 116 are seat 130, float 134, valve 136 and a closure member 138 at the bottom of the valve containing section 118. Liquid inlet slots or opening 139 are provided in the closure member 138 for communicating the interior of the valve body 116 with the liquid fuel as the tank fills for purposes to be discussed.

Figures 5, 6, 7:
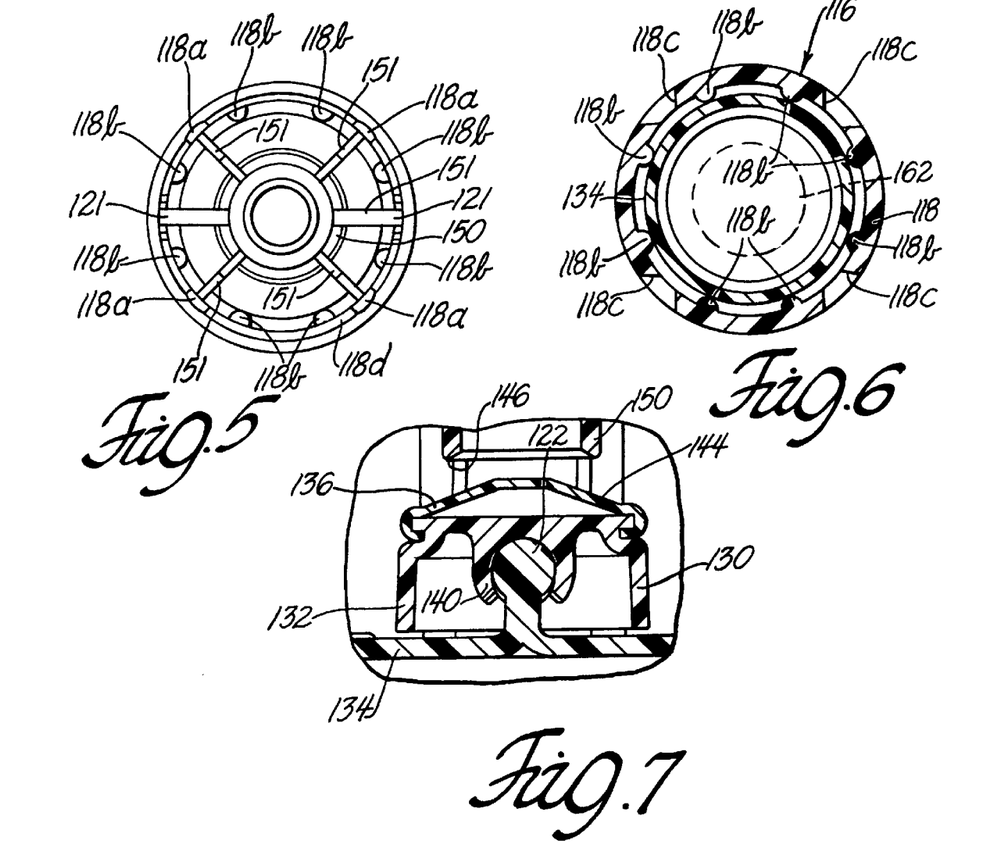
FIG. 5 is a sectional view taken substantially along the line 5—5 of FIG. 3 looking in the direction of the arrows.
FIG. 6 is a sectional view taken substantially along the line 6—6 of FIG. 3 looking in the direction of the arrows.
FIG. 7 is an enlargement of a portion of FIG. 3.

Seat 130 has an annular skirt 132 and a ball socket 140, as best shown in FIG. 7. A ball 142 is provided on the upper end of the float 134 for universally connecting the seat 130 to the float 134. The ball socket 140 preferably conforms closely to the ball 142 so that the seat 130 pivots freely relative to the float with little or no movement in the vertical direction. The float 134 is located within the valve housing 116 and has an outer wall 134a centered in spaced relationship to the inner wall of the valve section 118 by a plurality of circumferentially spaced, internal, vertical ribs 118b of the valve section 118. Vertical ribs 118b align float 134 centrally in valve housing 116 which minimizes the tilt of float 134 and increases sealing ability. Ribs 118b also reduce friction between float 134 and valve section 118.

Valve section 118 also has a plurality of circumferentially spaced, vertical slots 118c through the wall of valve section 118 that are used to attach the closure member 138 and enhance float response. Slots 118c commence near the lower end of valve section 118 and extend upwardly to a point just below the top of float 134 when float 134 is bottomed out on ball 162.

The valve 136 is made of a flexible elastomer and is circular in shape. Valve 136 includes a U-shaped rim for attachment to seat 130 and a conical surface 144 aligned with a matching conical valve seat 146 on the lower end of a vent tube 150. The flexibility of the elastomeric valve 136 and the matching conical shapes of surface 144 and valve seat 146 enhance valve performance. Sealing ability is improved by an increased contact area when valve 136 is closed and head loss of the fuel vapor flowing past valve 136 when valve 136 is open is reduced.

Vent tube 150 is preferably an integral part of body 116 and connected to the upper end of section 118 by four radial fins 151. Vent tube 150 has an annular collar 152 at the upper end that is located in sealing engagement with a vapor exit passage 154 in cover 122 when body 116 is attached to cover 122.

Accurate location of vent tube 150 by radial fins 151 and a strong coupling arrangement for attaching body 116 to cover 122 provides excellent sealing engagement that may be enhanced by an annular seal member 155 between the collar 152 and the cover 133.

The coupling arrangement is a bayonet slot type coupling comprising lugs 118a at the upper end of valve body section 118 and a plurality of L-shaped slots 119a in the outer surface of cover extension 119. Cover extension 119 slides into the upper end of valve body 118 against shoulder 118d with lugs 118b aligned with the axial, open-ended portions of the L-shaped slots 119a. Cover 122 is then rotated or indexed with respect to valve body 116 until lugs 118b bottom out in the circumferential closed-ended portions of the L-shaped slots 119a. This locks the cover 122 to valve body 116 in the axial and radial direction and in one circumferential direction. Cover 122 is locked to valve body 116 in the opposite circumferential direction by resilient lock fingers 121 that extend radially outwardly from vent tube 150 in cantilever fashion and engage notches 119b in the bottom of cover extension 119. Resilient fingers 121 are stressed while assembling cover 122 to valve body 116 but are preferably in an unstressed state when engaged in notches 119b. The several resilient fingers 121 must be depressed simultaneously in order to rotate cover 122 and position lugs 118 in the axial open ended portions of slots 119a to detach the cover from valve body 116.

The vent tube 150 receives fuel vapors from the fuel tank from vapor exit ports 153 formed in the upper end of the valve housing 118 at a point located closely adjacent the upper wall or top 12a of the fuel tank and at a point that is high enough above the valve seat 146 to avoid fuel carry over into the vapor exit passage and thence into the fuel vapor canister 14.

In this embodiment, approximately half of vapor exit ports 153 are above valve seat 146. However, vent tube 150 still locates the valve seat 146 a substantial distance below the top 12a of fuel tank 12 so that liquid fuel cannot flow in a direct linear path through vapor exit ports 153 into vapor exit passage 154 past valve seat 146. In fact liquid fuel can hardly flow directly into vent tube 150 as indicated by the imaginary lines 157 in FIG. 3.

In this embodiment, the float 134 is guided very accurately by the ribs 118b that maintain the outer wall 134a of the float 34 in a closely spaced relationship to the valve housing section 118.

The underside of the float 134 is configured to have a conical surface or ramp 160 that is supported on a ball 162 that is, in turn, supported by a conical inner surface or ramp 164 of the closure member 138. Ramp 160 preferably has a radius of curvature that is larger than the radius of ball 162 to increase the responsiveness of the float 134 by allowing the float 134 to move out of the static position easily when the refueling valve assembly 100 is tilted or subjected to a minor horizontal force.

In the illustrated arrangement, the float 134 is heavy enough not to shut off flow at low pressure buildups in the fuel tank 12, but is light enough to float in the fuel during a fuel filling operation in which the fuel level is raised in the fuel tank 12 toward the top 12a of fuel tank 12. Ribs 118a are placed such that the float 134 always floats straight up within the valve housing section 118 thereby to reduce frictional contact between the float 134 and the valve body 116. The angle of ramp of the conical surface 164 is configured such that it will allow the ball 162 to move and shut the float valve when the vehicle tilts greater than a predetermined amount, such as in a range of 30°. The ball 162 is also heavy enough to close the float valve shut by overcoming the buoyancy force created by the float 134 if the vehicle rolls over and the fuel tank 12 is inverted.

In the embodiment of the invention shown in FIGS. 2–9, the bottom closure member 138 includes tabs 138a that are configured to fit into slots 118c. Closure member 138 includes liquid inlet slots 139 to allow for a substantially unrestricted flow of fuel into the interior of the valve housing 118 for causing the float 134 to float in response to liquid fuel flow into the tank 12.

Slots 118c commence near the lower end of valve housing section 118 for receiving tabs 138a and also extend upwardly to a level just below the top of float 134 when the float 134 is bottomed out on ball 162. This elongation improves the response of the float 134 to the rising fuel level in fuel tank 12 during the fill procedure and during dynamic fuel sloshing due to vehicle operation. Moreover, the limited height of slots 118c inhibits liquid fuel splash into passage 154 through open valve 146.

Vapor exit passage 154 is large enough to vent vapors at the same rate as the rate of fuel flow into the fuel tank during a filling operation. The communication between the vapor exit ports 153 and the inlet end of the vapor tube 150 is selected so that there is no orifice-like restriction therebetween that can produce over pressurization of the tank during filling. The result is that there is substantially no pressure build up in the fuel tank during the refueling operation due to entrapment of vapor. The vapor exit ports 153 are configured and located so that vapor vents from tank 12 out the vapor exit passage 154 through an offset flow path defined by the vent exit ports 153 are located above and laterally of the entrance to the vent tube 150 at the valve seat 146. The vapor exit ports 153 are large enough to cause vapors to flow without restriction during the refueling operation. Furthermore, the vapor exit ports 153 are high enough in the tank so that the liquid droplets that might occur in the tank are not able to flow directly from the vapor exit ports 153 to the valve seat 146 during the refueling operation or during tilting or other jousting of the fuel tank 12 thereby to avoid any fuel carryover to the charcoal canister 14 that can affect its vapor absorbing capacity.

In the embodiment of FIGS. 2–9, the conical configuration of the tapered outer surface 144 is selected to slowly restrict vapor flow during closure of the float valve that would otherwise build up pressure in the fuel tank as the fuel moves the float upwardly during a fuel filing operation. The conical shape is configured so that there is enough pressure build up in the tank to shut the fuel nozzle supplying the tank from the fuel filler pipe off even though the float valve is not completely closed. This allows for some of the vapor to vent and drain the fuel in the filler pipe head as the tank reaches its fuel shut off level. Additionally, the conical part of the valve is loaded by the resistance of the material to allow the valve element 136 to shift into a centered relationship with the valve seat center 146 for sealing thereacross when the valve is closed.

Additionally, the above-described arrangement avoids a sudden build up of pressure in the tank that might otherwise cause a fuel spit back effect at the fill head.

The valve seat 146 is at the median level of the vapor exit ports 153 and is located at a height below the top of the fuel tank 12 to provide a desired fuel shut off height that will allow for an assured vapor dome space in the fuel tank that will enable vapor pressure buildup to occur after the float valve is closed.

Figure 8:
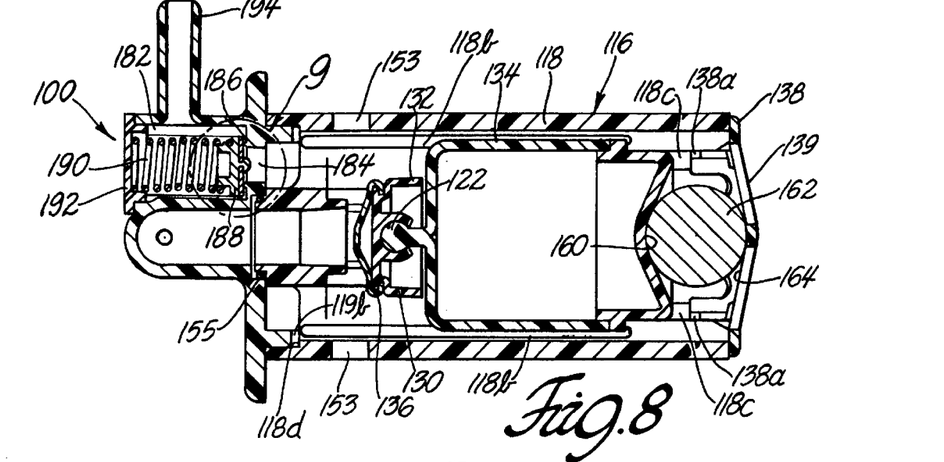
FIG. 8 is a sectional view taken substantially along the line 8—8 of FIG. 2 looking in the direction of the arrows.

The refueling valve assembly 100 also includes a pressure relief valve indicated generally at 180 to vent the fuel tank 12 under high pressure conditions. Pressure relief valve 180 comprises a valve chamber 182 formed as an integral part of cover 122. Valve chamber 182 communicates with the interior of tank 12 via opening 184 in cover 122 the interior of valve body section 118 and vapor exit ports 153. Opening 184 has a valve seat 186 inside chamber 182 that is closed by valve member 188 under the action of compression spring 190 disposed in chamber 182. Spring 190 reacts against cap 192 at the top of valve chamber 182. Valve chamber 182 has an exit pipe 194 that can be vented to atmosphere or connected to the fuel tank filler pipe by suitable hoses or conduit (not shown). Valve member 188 carries a thin elastomer seal 189 that mates flatly with the undersurface of valve member 188. This arrangement reduces compression set of the elastomer seal for improved performance after repeated high pressure opening of pressure relief valve 180.

Figures 9, 10:
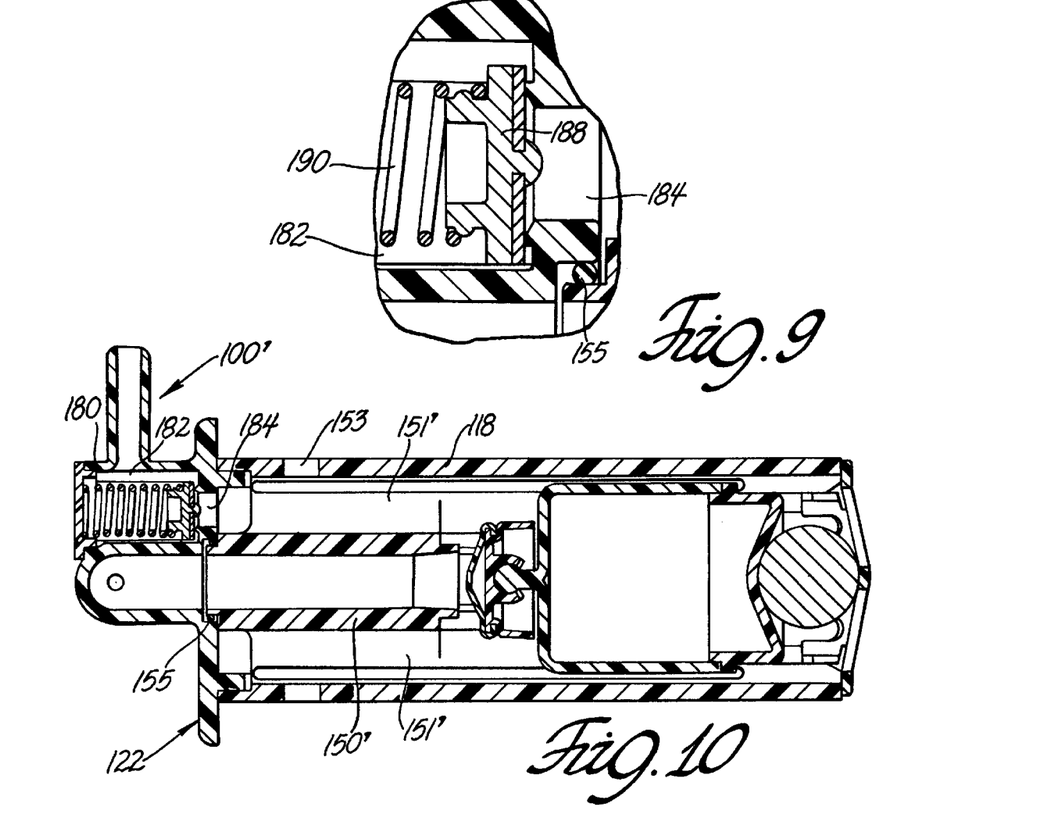
FIG. 9 is an enlargement of a portion of FIG. 8.
FIG. 10 is a sectional view of a modification of the vent valve assembly that is shown in FIGS. 2–9.

A modification is shown in FIG. 10. Refueling valve 100' is considerably longer than refueling valve 100 and includes a deeper vent tube 150' that is attached by four vertical fins 151'. The height of the vertical fins 151' is increased to maintain the accurate location of the deeper vent tube 150'. The parts of refueling valve 100' are otherwise the same as refueling valve 100 and corresponding parts are identified by the same numerals.

Referring now to FIGS. 11–16 several more preferred embodiments of a fuel vapor vent valve in accordance with another aspect of the invention are illustrated. These embodiments are designed to accommodate large side impact forces to fuel tank that are transferred to the valve parts that are located in the fuel tank.

Briefly the fuel vapor vent valves shown in FIGS. 11–16 all comprise a cover and a body that includes a float containing section with the body being connected to the cover so as to accommodate side impacts to the body within the fuel tank while maintaining the ability to effect closure of the valve.

Figure 11:
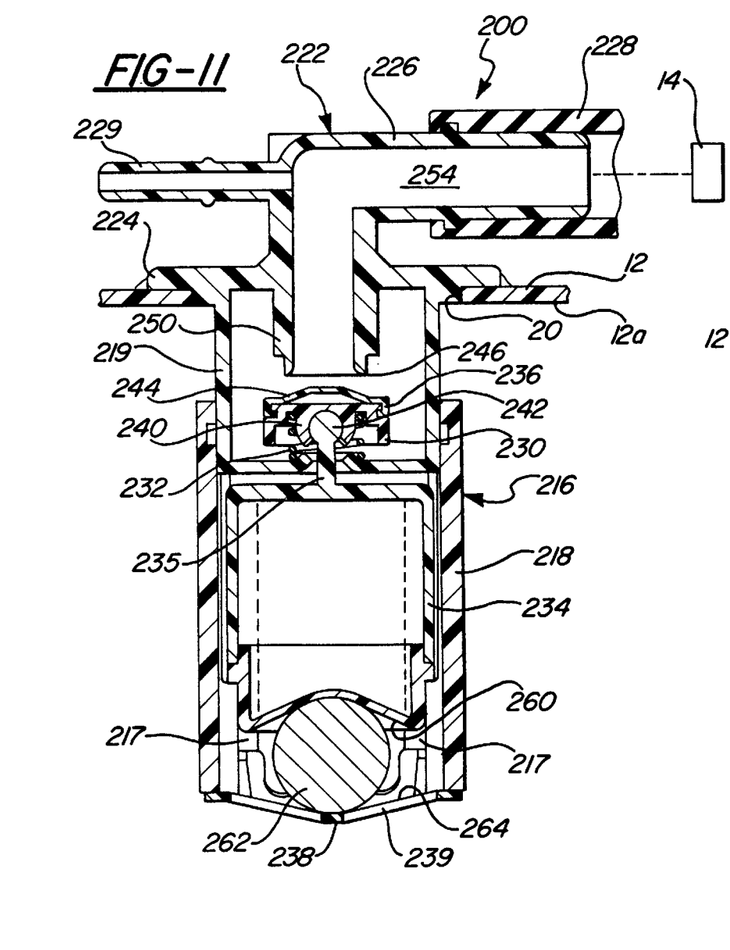
FIG. 11 is a sectional view of a second preferred embodiment of the invention.

The embodiment of the invention shown in FIG. 11 is characterized by a valve element that is housed in a chamber of the cover and detachably carried by the float. The cover has a spring within the chamber that biases the valve element toward a valve seat. When the body is subjected to side impacts above a predetermined magnitude, the valve element detaches from the float and closes against the valve seat under the action of the spring. This embodiment is effective in accommodating side impacts to the fuel tank. However, large side impact forces destroy the fuel vapor vent valve because the valve does not reopen when the fuel level is low. Hence the fuel vapor vent valve according to this embodiment must be replaced.

Figure 12:
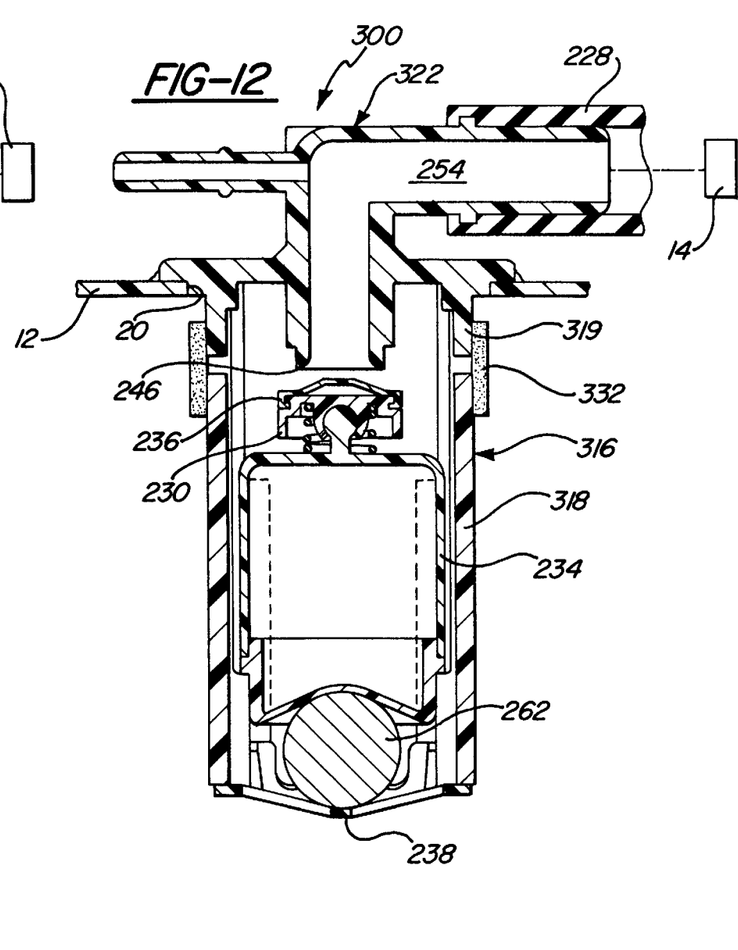
FIG. 12 is a sectional view of a third preferred embodiment of the invention.
Figures 13, 13A, 14:
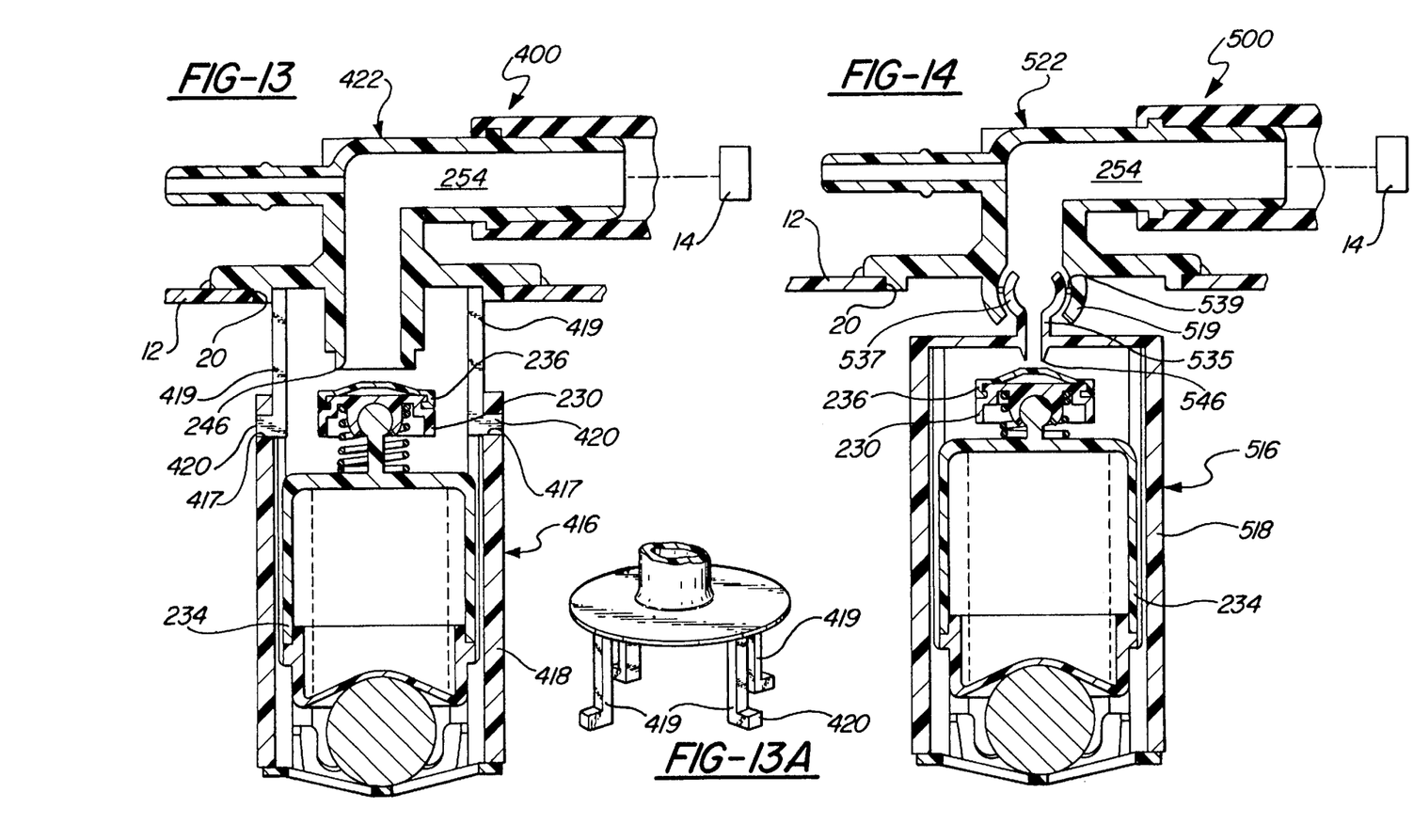
FIG. 13 is a sectional view of a fourth preferred embodiment of the invention.
FIG. 13A is a perspective view of a portion of the fourth preferred embodiment shown in FIG. 13.
FIG. 14 is a sectional view of a fifth preferred embodiment of the invention.

Third, fourth and fifth embodiments of the fuel vapor vent valve of the invention are illustrated in FIGS. 12, 13 and 14 respectively. These embodiments accommodate side impacts to the fuel tank and retain their ability to reopen so that these valves do not need to be replaced after being subjected to large side impact forces. In each of these embodiments the body is connected to the cover pivotally so that the body tilts in response to side impacts without destroying any part of the valve. The fuel vapor vent valve shown in FIG. 12 has a body that is pivotally connected to the cover by sleeve of elastomeric material. The fuel vapor vent valve shown in FIG. 13 has a body that is pivotally connected to the cover by a plurality of flexible arms. The fuel vapor valve shown in FIG. 14 has a body that is pivotally connected to the cover by a ball and socket arrangement.

Figure 15:
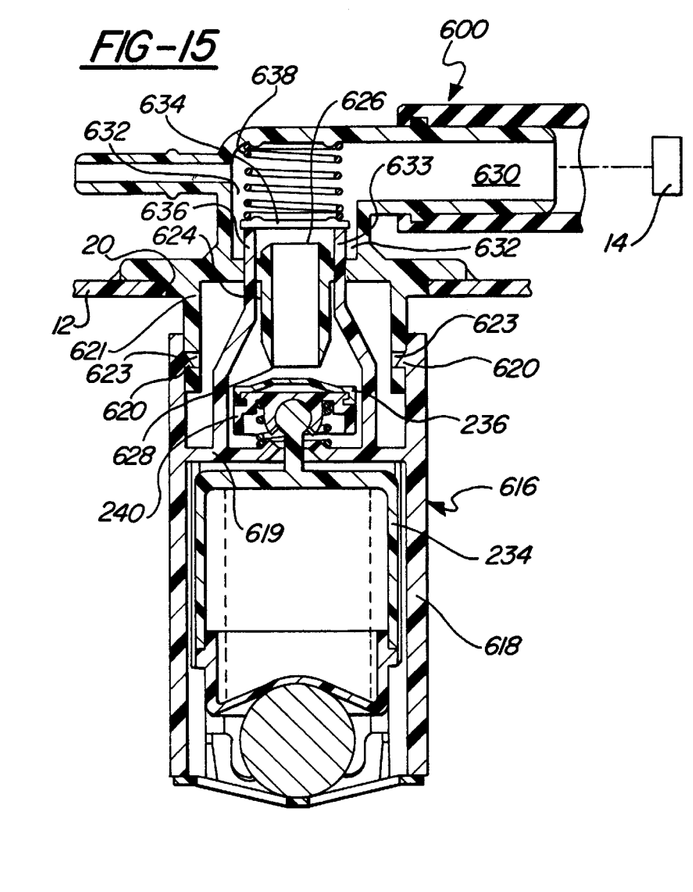
FIG. 15 is a sectional view of a sixth preferred embodiment of the invention.
Figure 16:
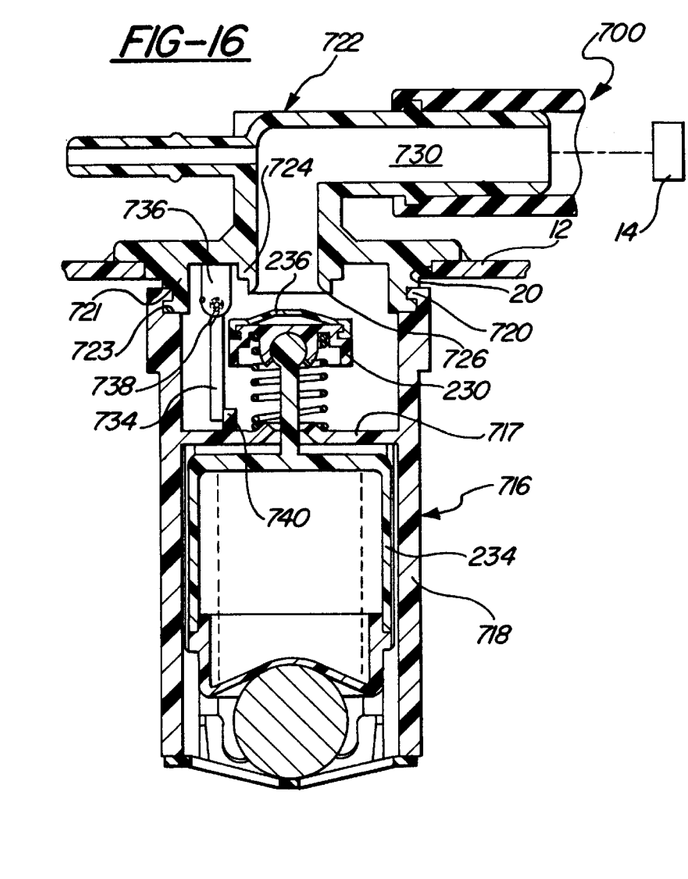
FIG. 16 is a sectional view of an seventh preferred embodiment of the invention.

Sixth and seventh embodiments of the fuel vapor vent valve of the invention are illustrated in FIGS. 15 and 16 respectively. These embodiments include a second valve element that closes the valve when the body is detached from the cover by a side impact to the fuel tank. In the sixth embodiment, the second valve element is connected to the body by frangible pins that are fractured when the body is detached. This sixth embodiment is effective in accommodating a high side impact force to the fuel tank. However, the valve of this sixth embodiment, like the embodiment of FIG. 11 must be replaced because the valve does not reopen when the fuel level is low.

In the seventh embodiment shown in FIG. 16, the second valve element pivots on the cover. It is closed by a spring when the body is detached by a side impact above a predetermined magnitude. None of the parts are destroyed when the body is detached. Consequently the valve of this embodiment can be restored easily and simply by resetting the second valve element and reattaching the body to the cover.

Returning now to FIG. 11, the second preferred embodiment of the invention is illustrated as fuel vapor vent valve 200. Valve 200 comprises body 216 that includes a generally cylindrical float containing section 218. Valve 200 has a cover 222 that includes a depending cylindrical chamber 219 that extends down through an opening 20 through the top wall of fuel tank 12 and telescopes into the upper end of body 216. Chamber 219 has a friction fit in the upper end of body 216 so that body 216 detaches from chamber 219 responsive to a side impact to body 216 above a predetermined magnitude.

Cover 222 is made of a high-density polyethylene (HDPE), this material being selected for its ability to weld to the fuel tank 12. Thus cover 222 can be welded about the perimeter of flange 224 to the fuel tank vertically oriented or in upright position as shown in FIG. 11. Valve cover 222 has an integrally formed hose fitting or outlet tube 226 by which the fuel vapor vent valve device is adapted to be connected by a hose 228 to the vapor storage canister 14. A smaller inlet tube 229 at the back end of outlet tube 226 provides for connecting a rollover or vent valve such as the valve shown in U.S. Pat. No. 5,413,137, cited above, in series with valve 200. Inlet tube 229 is eliminated or closed off in the absence of such a valve.

Float 234 is disposed in valve body 216 and a closure member 238 is attached to the bottom of the valve containing section 218. Liquid inlet slots 239 are provided in the closure member 238 for communicating the interior of the valve body 216 with the liquid fuel as the tank fills. Valve section 218 also has a plurality of circumferentially spaced, vertical slots 217 through the wall of valve containing section 218 that enhance float response. Slots 217 commence near the lower end of valve section 218 and extend upwardly to a point just below the top of float 234 when float 234 is bottomed out on ball 262.

Float 234 has a ball headed stem 235 that extends into chamber 219 through an opening in the bottom wall. Chamber 219 contains seat 230, compression spring 232 and valve element 236. Seat 230 has a ball socket 240 that pivots universally on a ball 242 at the upper end of stem 235. Ball socket 240 preferably conforms closely to ball 242 so that the seat 230 pivots freely relative to float 234 with little or no movement in the vertical direction. Compression spring 232 engages the bottom wall of chamber 219 and the bottom of seat 230 and biases seat 230 toward the top of chamber 219.

Valve element 236 is made of a flexible elastomer and is circular in shape. Valve element 236 includes a U-shaped rim for attachment to seat 230 and a conical surface 244 aligned with a matching conical valve seat 246 on the lower end of a vent tube 250. The flexibility of the elastomeric valve element 236 and the matching conical shapes of surface 244 and valve seat 246 enhance valve performance. Sealing ability is improved by an increased contact area when valve element 236 is closed and head loss of the fuel vapor flowing past valve 236 when valve element 236 is open is reduced.

Vent tube 250 is preferably an integral part of cover 222 which can be molded in one piece as shown in FIG. 11 or molded in separate pieces that are welded or otherwise secured together.

The underside of the float 234 is configured to have a conical surface or ramp 260 that is supported on a ball 262 that is, in turn, supported by a conical inner surface or ramp 264 of the closure member 238. Ramp 260 preferably has a radius of curvature that is larger than the radius of ball 262 to increase the responsiveness of the float 234 by allowing the float 234 to move out of the static position easily when valve 200 is tilted or subjected to a minor horizontal force.

In the illustrated arrangement, float 234 is heavy enough not to shut off flow at pressure buildups in fuel tank 12, but is light enough to float in the fuel during a fuel filling operation in which the fuel level is raised in the fuel tank 12 toward the top 12a of fuel tank 12. The angle of ramp of the conical surface 264 is configured such that it will allow the ball 262 to move and shut the float valve when the vehicle tilts greater than a predetermined amount, such as 30°. The ball 262 is also heavy enough to close the float valve shut by overcoming the buoyancy force created by the float 234 if the vehicle rolls over and the fuel tank 12 is inverted.

As indicated above, when body 216 is subjected to a side impact above a predetermined magnitude, body 216 detaches from chamber 219 of cover 222. As body 216 detaches, seat 240 breaks away from float 234 and compression spring 232 biases valve element 236 into sealing engagement with valve seat 246. Valve 200 thus accommodates large side impact forces to fuel tank 12 while maintaining the ability to close so as to prevent any significant fuel leakage past valve seat 246 into vapor exit passage 254 and thence into canister 14.

Referring now to the embodiment shown in FIG. 12, the third preferred embodiment of the invention is illustrated as fuel vapor vent valve 300. Valve 300 has several parts that are identical to the parts of valve 200 and that are identified with the same numerals. The basic difference lies in the attachment of modified valve body 316 and cover 322 by an elastomeric sleeve 332. Valve body 316 still includes a generally cylindrical float containing section 318. However, valve body 316 has a generally uniform outer diameter from end to end. Valve cover 322 now includes a depending cylindrical collar 319 that extends down through an opening 20 through the top wall of fuel tank 12 and that has substantially the same outer diameter as valve body 316. Valve body 316 is connected to collar 319 by a sleeve 332 of elastomeric material. Collar 319 telescopes into an upper end of sleeve 332 and the upper end of body 316 telescopes into the lower end of sleeve 332, each with a friction fit. Collar 319 and body 316 are spaced from each other in the vertical direction so that body 316 tilts with respect to cover 322 responsive to side impacts to body 316 above a predetermined magnitude. When body 316 tilts, float 234 still rises and falls in float containing section 318 in response to the fuel level in full tank 12. Since valve element 236 is attached to seat 230 that is pivotally mounted on float 234, valve seat 246 is still closed off in response to a high fuel level in fuel tank 12. Valve 300 thus accommodates large side impact forces to fuel tank 12 by tilting valve body 316 while maintaining the ability to close when valve body 316 is tilted so as to prevent any significant fuel leakage past valve seat 246 into vapor exit passage 254 and thence into canister 14. Moreover, valve 300 is still functional after the side impact forces are removed because valve body 316 returns to the vertical position under the self restoring forces of elastomeric sleeve 332.

Referring now to the embodiment shown in FIG. 13, the fourth preferred embodiment of the invention is illustrated as fuel vapor vent valve 400. Valve 400 has several parts that are identical to the parts of valve 200 and that are identified with the same numerals. The basic difference lies in the attachment of modified valve body 416 and cover 422. Valve body 416 still includes a generally cylindrical float containing section 418. However, valve body 416 has a plurality of square holes 417 that are spaced circumferentially around the cylindrical valve body 416 at the upper end. Valve cover 322 now includes a plurality of flexible depending arms 419 that are spaced circumferentially and that have square lugs 420 at their lower ends that extend outwardly in the radial direction as shown in FIG. 13A. Flexible arms 419 extend down through an opening 20 through the top wall of fuel tank 12. The lower portions of flexible arms 419 extend into the upper end of valve body 416 with radial lugs 420 engaging in holes 417 to attach valve body 416 to cover 422.

The upper end of valve body 416 is spaced a sufficient distance below the top of fuel tank 12 so that sufficient portions of flexible arms 419 are free to flex whereby valve body 416 is attached to cover 422 by flexible arms 419 in a substantially pivotal fashion. With such an attachment, valve body 416 tilts with respect to cover 422 responsive to side impacts to body 416 above a predetermined magnitude. When body 416 tilts, float 234 still rises and falls in float containing section 418 in response to fuel level. Since valve element 236 is attached to seat 230 that is pivotally mounted on float 234, valve seat 246 is still closed off in response to a high fuel level in fuel tank 12. Valve 400 thus accommodates large side impact forces to fuel tank 12 by tilting valve body 416 while maintaining the ability to close when valve body 416 is tilted so as to prevent any significant fuel leakage past valve seat 246 into vapor exit passage 254 and thence into canister 14. Moreover, valve 400 like valve 300 is still functional after the side impact forces are removed because valve body 416 returns to the vertical position under the self restoring forces of flexible arms 419.

Referring now to the embodiment shown in FIG. 14, the fifth preferred embodiment of the invention is illustrated as fuel vapor vent valve 500. Valve 500 also has several parts that are identical to the parts of valve 200 and that are identified with the same numerals. The basic difference lies in the attachment of modified valve body 516 and cover 522. Valve body 516 still includes a generally cylindrical float containing section 518. However, valve body 516 has an internal valve seat 546 at the upper end and a hollow stem 535 that extends upward from the top of valve body 516. Hollow stem 535 includes a part spherical portion 537. Valve cover 522 now includes a depending hollow socket 519 that extends down through an opening 20 through the top wall of fuel tank 12 and receives the part spherical portion 537 of the valve body stem 535 to provide a ball and socket connection. The interior of fuel tank 12 communicates with vent passage 254 via hollow stem 535 which pivots in a sealed relationship in socket 519 by reason of an O-ring seal 539.

With this ball and socket arrangement, valve body 516 tilts with respect to cover 522 responsive to side impacts to body 516 above a predetermined magnitude. When body 516 tilts, float 234 still rises and falls in float containing section 518 in response to fuel level. Since valve element 236 is attached to seat 230 that is pivotally mounted on float 234, valve seat 246 is still closed off in response to a high fuel level in fuel tank 12. An advantage of this design is that valve seat 546 also tilts with valve body 516 so that tilting of valve element 236 with respect to float 234 is minimal. Valve 500 thus accommodates large side impact forces to fuel tank 12 while maintaining the ability to close so as to prevent any significant fuel leakage past valve seat 546 into vapor exit passage 254 and thence into canister 14. Moreover, valve 500 like valves 300 and 400 is still functional after the side impact forces are removed because valve body 516 can be returned to the vertical position.

Referring now to the embodiment shown in FIG. 15, the sixth preferred embodiment of the invention is illustrated as fuel vapor vent valve 600. Valve 600 has several parts that are identical to the parts of valve 200 and that are identified with the same numerals. The basic difference lies in the provision for a second valve element 634 and a modified valve body 616 and cover 622 to accommodate the second valve element. Valve body 616 still includes a generally cylindrical float containing section 618. However, valve body 616 has an intermediate wall 619 at the upper end of section 618 and a plurality of lugs 620 that are spaced circumferentially around the upper end and extend radially inwardly.

Valve cover 622 now includes a depending cylindrical collar 621 that extends down through an opening 20 through the top wall of fuel tank 12 and that has a plurality of radial holes 623 spaced circumferentially around the lower end that receive lugs 620 to attach valve body 616 to cover 622. Valve cover 622 further includes an integral vent tube 624 that provides an upper valve seat 626 and a lower valve seat 628 at opposite ends as well as communication between the interior of fuel tank 12 and vapor vent passage 630. Vapor vent passage 630 includes a valve chamber 632 adjacent upper valve seat 626 that contains the second valve element 634. Valve element 634 is connected to intermediate wall 619 of valve body 616 by a plurality of circumferentially spaced frangible pins 636. Pins 636 are attached to intermediate wall 619 at one end and project upwardly through holes in cover 622 into valve chamber 632 where the other ends of pins 636 are attached to valve element 634. Cover 622 also contains a compression spring 638 that biases valve element 634 downwardly toward upper valve seat 626. However, valve element 634 is held away from upper valve seat 626 by the frangible pins 636.

Under normal operating conditions, primary valve element 236 cooperates with lower valve seat 628 to open and close valve 600 in response to the fuel level in fuel tank 12. However, when body 616 is subjected to a side impact above a predetermined magnitude, body 616 detaches from collar 621 of cover 622 and carries primary valve element 236 away with it. As body 616 detaches, pins 621 fracture breaking second valve clement 634 away from valve body 616 and allowing compression spring 638 to bias second valve element 634 into sealing engagement with upper valve seat 626. Valve 600 thus accommodates large side impact forces to fuel tank 12 while maintaining the ability to close so as to prevent any significant fuel leakage past valve seat 626 into vapor exit passage 630 and thence into canister 14. Valve 600 like valve 200 must be replaced because the valve does not reopen after valve body 616 is detached and pins 621 are fractured.

Referring now to the embodiment shown in FIG. 16, the seventh preferred embodiment of the invention is illustrated as fuel vapor vent valve 700.

Valve 700 has several parts that are identical to the parts of valve 200 and that are identified with the same numerals. Like the sixth embodiment of FIG. 15, the basic difference lies in the provision for a second valve element 734 and a modified valve body 716 and cover 722 to accommodate the second valve element. Valve body 716 still includes a generally cylindrical float containing section 718. However, valve body 716 has an intermediate wall 719 at the upper end of section 718 and a circumferential lip 720 around the upper end that extends radially inwardly.

Valve cover 722 now includes a depending cylindrical collar 721 that extends down through an opening 20 through the top wall of fuel tank 12 and that has a circumferential slot 723 around the lower end that receives lip 720 to attach valve body 716 to cover 722. Valve cover 722 further includes a short integral vent tube 724 that provides a valve seat 726 at the lower end as well as communication between the interior of fuel tank 12 and vapor vent passage 630. Valve cover 722 carries a second valve element 734 that is connected to the cover by a hinge 736 so that valve element 734 pivots from an open vertical position to a closed horizontal position where valve element 734 engages valve seat 726. Valve 700 also includes a torsion spring 738 that biases valve element 734 toward the closed position, that is, in the counterclockwise direction from the open position shown in FIG. 16. Valve element 734 is held in the open position by a stop 740 that projects upward from intermediate wall 719.

Under normal operating conditions, primary valve element 236 cooperates with valve seat 726 to open and close valve 700 in response to the fuel level in fuel tank 12. However, when body 716 is subjected to a side impact above a predetermined magnitude, body 716 detaches from collar 721 of cover 722 and carries primary valve element 236 away with it. As body 716 detaches, stop 740 unblocks secondary valve element 734 allowing torsion spring 738 to bias valve element 734 into sealing engagement with valve seat 726. Valve 700 thus accommodates large side impact forces to fuel tank 12 while maintaining the ability to close so as to prevent any significant fuel leakage past valve seat 726 into vapor exit passage 730 and thence into canister 14. Valve 700 need not be replaced like valve 200 or valve 600 because the valve 700 does not have any broken parts after valve body 716 is detached from valve cover 622. Valve 700 can be restored easily and simply by resetting the second valve element 734 in the open position and reattaching valve body 716 to valve cover 722.

While the invention has been illustrated primarily in connection with a refueling valve, it should be understood that the invention may have advantages in connection with other types of valves particularly valves that are used to vent fuel vapor from fuel tanks.

Obviously, many modifications and variations of the present invention in light of the above teachings may be made. It is, therefore, to be understood that, within the scope of the appended claims, the invention may be practiced otherwise than as specifically described.

What is claimed is:

1. A fuel vapor vent valve adapted to be mounted in the top of a motor vehicle fuel tank, said assembly comprising a body having an inlet passage adapted to be open to liquid fuel and fuel vapor and a cover adapted to be connected to the top of a fuel tank and having a vapor exit passage adapted to be connected to a fuel vapor storage device, the body being connected to the cover and adapted to be disposed in the fuel tank in depending relationship with the cover; and a valve including a float and a valving element carried by the float and tiltable with respect to the float for compensating for tilt further characterized by:

said body further including a float containing section, and the body being connected to the cover to accommodate side impacts within the fuel tank while maintaining the ability to effect closure of the valve, the body being tiltably connected to the cover so that the body tilts responsive to a predetermined side impact.

2. The fuel vapor vent valve of claim 1 further characterized in that the body is tiltably connected to the cover by an annular elastomeric member.

3. The fuel vapor vent valve of claim 1 further characterized in that the body is tiltably connected to the cover by a plurality of flexible arms.

4. The fuel vapor valve of claim 1 further characterized in that the body is tiltably connected to the cover by a ball and socket arrangement comprising a hollow, part spherical stem of the body that is disposed in a socket of the cover.

5. A fuel vapor vent valve adapted to be mounted in the top of a motor vehicle fuel tank, said assembly comprising a body having an inlet passage adapted to be open to liquid fuel and fuel vapor and a cover adapted to be connected to the top of a fuel tank and having a vapor exit passage adapted to be connected to a fuel vapor storage device, the body being connected to the cover and adapted to be disposed in the fuel tank in depending relationship with the cover; and a valve including a float and a valving element carried by the float further characterized by:

the body further including a float containing section that is tiltably connected to the cover by a ball and socket arrangement so as to tilt responsive to a predetermined side impact to accommodate side impacts within the fuel tank while maintaining the ability to effect closure of the valve, the ball and socket arrangement comprising a hollow, part spherical stem of the body that is disposed in a socket of the cover.

6. A fuel vapor vent valve adapted to be mounted in the top of a motor vehicle fuel tank, said assembly comprising a body having an inlet passage adapted to be open to liquid fuel and fuel vapor and a cover adapted to be connected to the top of a fuel tank and having a vapor exit passage adapted to be connected to the top of a fuel tank and having a vapor exit passage adapted to be connected to a fuel vapor storage device, the body being connected to the cover and adapted to be disposed in the fuel tank in depending relationship with the cover; and a valve including a float and a valving element carried by the float further characterized by:

the body further including a float containing section having an upper wall that includes a hollow partispherical stem, the cover having a partispherical socket in fluid communication with the vapor exit passage, and the partispherical stem being disposed in the partispherical socket so that the body tilts with respect to the cover responsive to a predetermined side impact to accommodate side impacts within the fuel tank while maintaining the ability to effect closure of the valve.

7. The fuel vapor vent valve as defined in claim 6 wherein the hollow stem protrudes the upper wall and has a valve seat located below the upper wall.

* * * * *